United States Patent [19]
Schultz et al.

[11] Patent Number: 5,806,149
[45] Date of Patent: Sep. 15, 1998

[54] BENT WIRE SPRING CLIP FASTENERS

[75] Inventors: Steven F. Schultz, Maple Glen; Thomas L. Weil, Elverson, both of Pa.

[73] Assignee: Davlyn Manufacturing Co., Inc., Spring City, Pa.

[21] Appl. No.: 933,670

[22] Filed: Sep. 19, 1997

Related U.S. Application Data

[63] Continuation-in-part of Ser. No. 514,057, Aug. 11, 1995, abandoned.

[51] Int. Cl.$^6$ .............................. E06B 7/00; A44B 17/00
[52] U.S. Cl. ............................... 24/296; 24/291; 49/492.1
[58] Field of Search ........................... 24/296, 289, 291, 24/292, 293; 49/491.1, 492.1

[56]  References Cited

U.S. PATENT DOCUMENTS

| | | | |
|---|---|---|---|
| 1,896,590 | 2/1933 | Place | 24/296 |
| 2,020,206 | 11/1935 | Place | 24/296 |
| 2,043,007 | 6/1936 | Place | 24/296 |
| 2,215,428 | 9/1940 | Place | 24/296 |
| 2,220,825 | 11/1940 | Place | 24/296 |
| 2,894,301 | 7/1959 | Scott | 24/291 |
| 2,935,770 | 5/1960 | Gagnier | 24/296 |
| 4,081,647 | 3/1978 | Torrey | 219/10.55 D |
| 4,541,203 | 9/1985 | Naffrechoux et al. | 49/485 |
| 4,822,060 | 4/1989 | Moyer et al. | 277/166 |
| 4,836,080 | 6/1989 | Kite, III et al. | 87/9 |
| 4,979,280 | 12/1990 | Weil | 29/446 |
| 4,986,033 | 1/1991 | Weil | 49/492.1 |
| 4,989,422 | 2/1991 | Barlow et al. | 66/170 |
| 5,082,297 | 1/1992 | Flasher | 277/230 |
| 5,107,623 | 4/1992 | Weil | 49/492.1 |
| 5,186,992 | 2/1993 | Kite, III | 428/36.3 |
| 5,197,370 | 3/1993 | Gladfelter | 87/7 |
| 5,205,075 | 4/1993 | Moyer | 49/493 |
| 5,289,658 | 3/1994 | Lusen et al. | 49/492.1 |
| 5,341,601 | 8/1994 | Moyer | 49/493.1 |
| 5,395,126 | 3/1995 | Tresslar | 277/166 |

FOREIGN PATENT DOCUMENTS 0681678  10/1952  United Kingdom .................... 24/296

*Primary Examiner*—Victor N. Sakran
*Attorney, Agent, or Firm*—Panitch, Schwarze, Jacobs & Nadel, P.C.

[57]  ABSTRACT

Improved spring fasteners are formed from a single length of at least partially hardened wire bent to form a generally planar base and a generally diamond-shape engagement portion or dart extending generally perpendicularly from the center of the base. The length of wire is bent at its center to form the dart. Free ends of the wires are crossed past and partially around one another to provide a scissor action to arms forming either side of the dart. The free end portions of the wire are extended away from the dart in opposite directions. Each is curled into a circular loop in which the extreme end of the wire is overlapped or butted with an intermediate portion of the wire to form a fully closed loop at either end of the base. The configurations are actually less compact than previous configurations and, as a result, is less likely to nest with identical fasteners. Fasteners can be used with gasket or gasket-like devices, including a tubular member woven from strand material such as wire, fiberglass or a combination of different strand materials. The base of the fastener is positioned against the inner side of the tubular wall of the tubular member while the engagement portion passes through the member and away from its outer circumferential side.

20 Claims, 2 Drawing Sheets

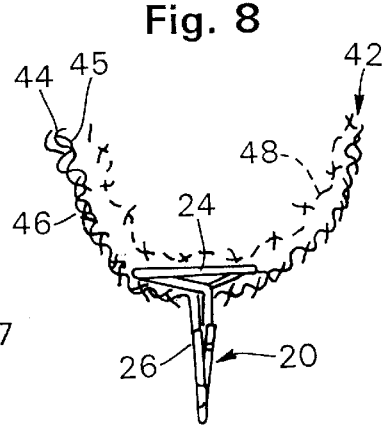
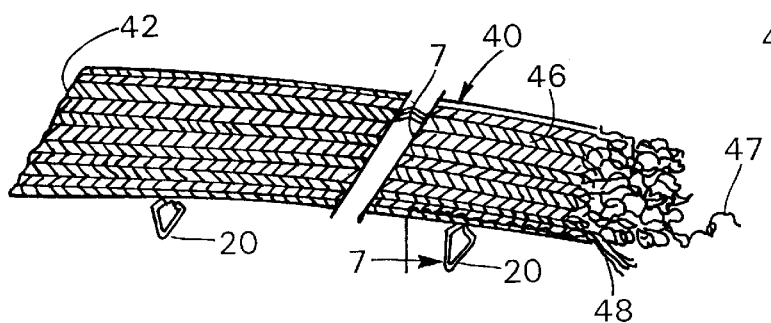
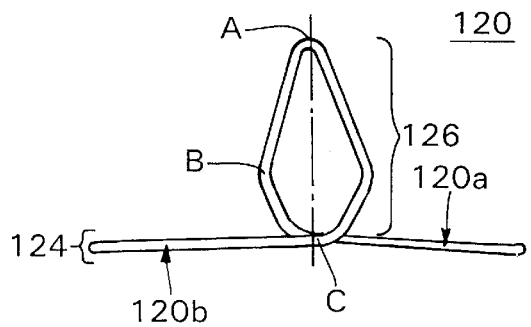
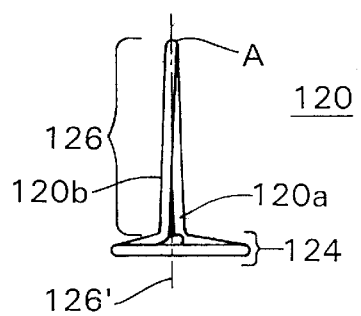
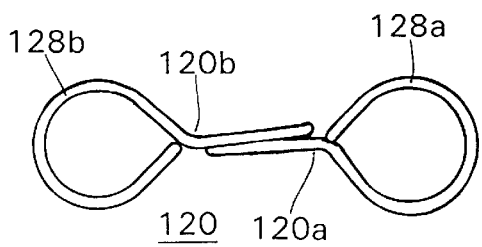
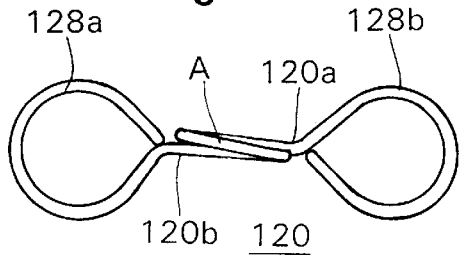

BENT WIRE SPRING CLIP FASTENERS

CROSS-REFERENCE TO RELATED APPLICATIONS

This application is a continuation-in-part of U.S. application Ser. No. 08/514,057 filed Aug. 11, 1995, now abandoned.

BACKGROUND OF THE INVENTION

The invention relates to fasteners and to bent wire spring fasteners, in particular.

U.S. Pat. No. 5,107,623 discloses in FIG. 8, a bent wire spring fastener designed for installation in a flexible gasket or gasket-like device so as to mount such gasket or device to a support.

The described spring fastener is formed from a single length of wire having a circular cross-section. The wire is bent so as to form at its center a generally diamond-shaped engagement portion or dart (124), which is generally planar and which projects transversely from one side of a generally planar, rectangular shaped base, which is formed by the remainder of the wire. The dart is located generally at the center of the rectangular base. The free ends of the wire come together in the base at a point opposite where the dart is located. These ends are left unattached to one another so as to be able to separate and move with respect to one another when "arms" of the fastener are squeezed together, for example, when a dart is inserted into an opening of a support the gasket or gasket-like device is stalled.

U.S. Pat. No. 5,107,623 further states that the fasteners are preferably installed automatically in such gaskets or gasket-like devices through an inserting mechanism which includes a vibrating bowl having a reservoir for orienting and feeding the fasteners to the mouth of a stationary chute along which fasteners may be individually fed by an escapement mechanism for insertion into the gasket or gasket-like device as it is being made.

It has been found through experience in making these gaskets and gasket-like devices that the original bent wire spring fastener disclosed in U.S. Pat. No. 5,107,623, encounters certain problems during manufacture and during automatic feeding operation.

An ideal prior fastener 10 is depicted in FIGS. 1 and 2. In such a fastener, the base is rectangular and the fastener ends come together and overlap side by side as shown or butt. However, in practice it is extremely difficult to obtain a fastener of the ideal configuration depicted. The fastener 10 requires thirteen bends. The last bends forming the base require over bending of what is a spring wire. In many instances the bend tolerances sometimes left the ends too short to come together. Sometimes the ends were cocked or skewed at an angle so they did not come together. As a result, tangling of the fastener bases was a major problem. Fasteners could become so entangled with one another that they could not be separated automatically by vibration. Workers had to constantly separate fasteners by hand and at times fasteners became so entangled that masses had to be returned to the manufacturer or discarded.

In addition, the unattached ends of the wire, if sufficiently turned away from the direction of the dart, would permit the base of an adjoining fastener to pass through the unattached ends and into the base area where the two fasteners overlap sufficiently closely that they were fed as a single element through the remainder of the system. The gaskets and gasket-like devices in which the fasteners are installed are manufactured in continuous lengths. One of the benefits of the design of such gaskets and gasket-like devices is that the fasteners cannot be separated from the gasket or gasket-like device without destroying the device itself. Accordingly, when such imperfections appear, the gasket or gasket-like device must be severed to remove the flawed portion. Where the severed length is less than the standard length sold, it had to be discarded.

BRIEF SUMMARY OF THE INVENTION

In one aspect, the invention is an improvement in a bent wire spring fastener, which is formed by a single length of at least partially hardened metal wire having a pair of opposing ends. The wire is bent to form a generally planar base with a generally planar dart projecting transversely from one side of the base. The improvement is one wherein at least one of the ends of the wire is bent back upon another portion of the wire intermediate the ends and overlapped with the other portion so as to define a completely closed portion of the base on one lateral side of the dart.

In another aspect, the invention is an improvement in a bent wire spring fastener, which is formed by a single length of metal wire hardened along at least part of its length, the wire being bent to form a generally planar base with a generally planar dart projecting transversely from one generally planar major side of the base, an improvement wherein each of the dart and the base has a plane and a central longitudinal axis in the plane, the central longitudinal axis of each of the dart and base being greater in magnitude than any lateral axis of the dart and base perpendicular to the central longitudinal axis in the respective planes of the dart and the base, wherein the dart is at least generally centered on the base such that the central longitudinal axes of the dart and the base generally intersect one another, wherein the wire includes a medial bend defining a tip of the dart distal to the base and a pair of arms continuous from the medial bend, each arm extending away from the medial bend and one another and then towards one another along separate initial sides of the central longitudinal axis of the dart, the pair of arms crossing by one another, side by side, generally at the central longitudinal axis of the dart to respective opposing sides of central the longitudinal axis of the dart, the crossing defining an end of the dart proximal the base, free ends of the arms extending away from the crossing and apart from one another and terminating in separate closed loop portions on the respective opposing sides of the central longitudinal axis of the dart.

In yet another aspect, the invention is an improvement in a bent wire spring fastener, which is formed by a single length of metal wire hardened along at least part of its length, the wire being bent to form a generally planar base with a generally planar dart projecting transversely from one generally planar major side of the base, an improvement wherein each of the dart and the base has a plane and a central longitudinal axis in the plane, the central longitudinal axis of each of the dart and base being greater in magnitude than any lateral axis of the dart and base perpendicular to the central longitudinal axis of the dart and the base in the respective planes of the dart and the base, wherein the dart is at least generally centered on the base such that the longitudinal axes of the dart and the base generally intersect one another, wherein the wire includes a medial bend defining a tip of the dart distal to the base and a pair of identical arms continuous from the medial bend, each arm extending away from the medial bend and one another and then towards one another along separate initial sides of the longitudinal axis of the dart, the pair of arms crossing by one another, side by side, generally at the longitudinal axis of the dart to respective opposing sides of the longitudinal axis of the dart, the crossing defining an end of the dart proximal the base, remaining free ends of the arms extending apart and away from the crossing and defining the base.

BRIEF DESCRIPTION OF THE SEVERAL VIEWS OF THE DRAWINGS

The foregoing summary, as well as the following detailed description of preferred embodiments of the invention will be better understood when read in conjunction with the appended drawings. For the purpose of illustrating the invention, there is shown in the drawings embodiments which are presently preferred. However, it should be understood that the invention is not limited to the precise arrangements and instrumentalities shown. In the drawings:

FIG. 7 depicts diagrammatically a pair of the improved fasteners mounted in a tubular member to form a gasket or gasket-like device;

FIG. 8 is a cross-sectional view taken along the line 8—8 of FIG. 7;

FIG. 9 is a side elevational view of a second preferred embodiment bent wire spring fastener;

FIG. 10 is a front elevational view of the spring fastener of FIG. 9; and

FIG. 11 is a top plan view of the spring fastener of FIG. 9.

FIG. 12 is a bottom plan view of the spring fastener of FIGS. 9.

DETAILED DESCRIPTION OF THE INVENTION

Figure 1:
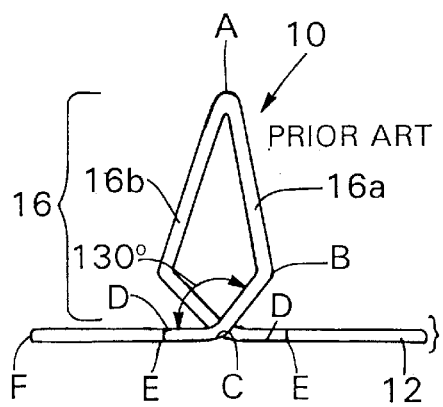
FIG. 1 is a side elevational view of the prior art spring fastener.

Certain terminology is used in the following description for convenience only and is not intended to be limiting. The words "right", "left", "lower" and "upper" designate directions in the drawings to which reference is made. The words "radial" and "axial" refer to directions perpendicular to and along the central axis of an object, element or structure referred to are the words "inwardly" and "outwardly" refer to directions towards and away from, respectively, the geometric center of the object, element or structure. The terminology includes the words above specifically mentioned, derivatives thereof and words of similar import. Moreover, throughout the drawings, like numerals are used to indicate like elements.

Figure 2:
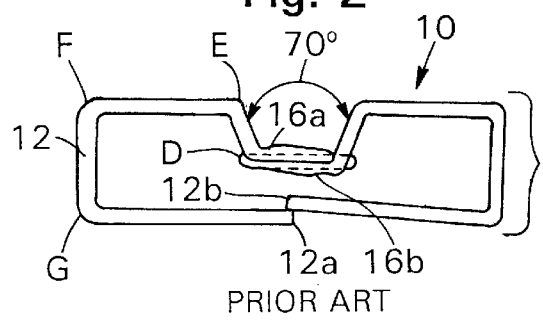
FIG. 2 is a bottom plan view of the prior art fastener of FIG. 1.

The ideal, original bent wire spring fastener is indicated at 10 in FIGS. 1 and 2. It is made from a single wire 12 having opposing ends 12a, 12b. The wire is bent at its center (A) to form the distal tip of a preferably diamond shaped engagement portion or dart 16. Each wire half is bent two more times (B, C) to define the remainder of the generally planar, diamond shape. At the base of the diamond, the free ends of the wire are bent at about 130° angles and extended past one another, side by side, in opposite directions. This permits the side portions or "sides" 16a, 16b of the dart 16 to scissor with respect to one another. Each of the free wire portions is bent again (D) generally transversely to the plane of the dart 16 to form an included angle of about 70° with one another (FIG. 2) to begin defining a base portion or "base" 14 of the fastener 10. Each remaining free end portion of the wire 12 is bent three more times (E, F, G) to form the remainder of the generally rectangular, generally planar base 14. The dart 16 projects generally transversely from one generally planar major side, the "upper" side of the base 14. As indicated in FIG. 2, bends D and E position the dart 16 generally at the center of the generally rectangular base 14. The wire ends 12a, 12b are left unattached so that they might move and even overlap with respect to one another when the arm portions 16a, 16b defining the dart 16 are squeezed together and released.

Figure 3:
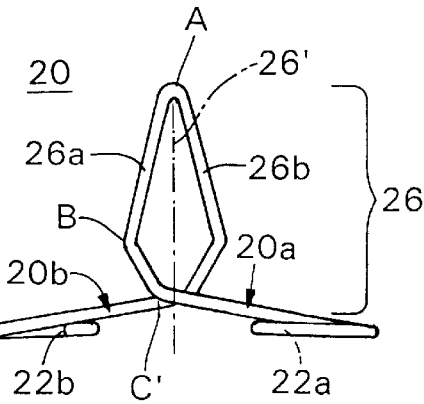
FIG. 3 is a side elevational view of a first preferred embodiment improved bent wire spring fastener of the present invention.
Figure 4:
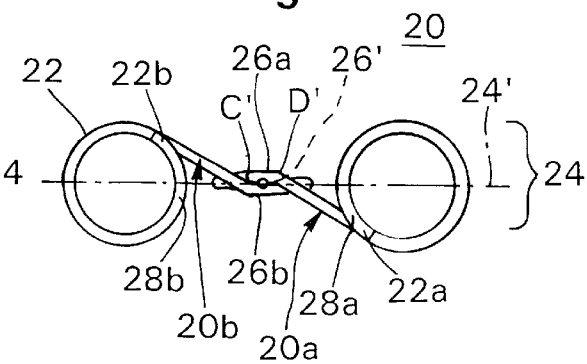
FIG. 4 is a bottom plan view of the spring fastener of FIG. 3.
Figure 5:
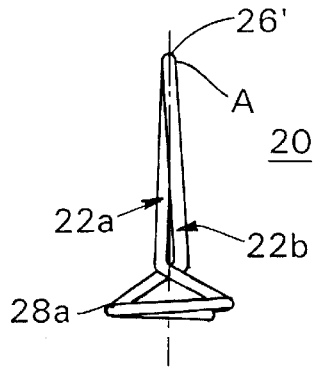
FIG. 5 is a front elevational view of the spring fastener of FIGS. 3 and 4.

FIGS. 3 through 5 depict a first preferred embodiment, bent wire spring fastener of the present invention indicated generally at 20. The fastener 20 is made from a single length of at least partially hardened wire 22. The wire 22 is bent to define a base portion or "base" 24 less planar than base 14 but still generally planar and a generally planar, generally diamond-shaped engagement portion or dart 26 projecting from one major planar side 25 of the base 24. The dart or engagement portion 26 is preferably at least substantially identical to the dart/engagement portion 16 of the prior fastener 10 and is formed generally at the center of the length of wire 22 by bending the wire at three places (A, B, C') into the indicated generally diamond shape to form the pair of opposing side portions or "sides" 26a, 26b of dart 26. The free portions of the wire 22 are bent at C' preferably to form an included angle greater than 130° (see FIG. 3), are extended past one another, side by side, the crossing defining the end of the dart 26 proximal the base 24. The remaining free end portions of the wire 12 are bent again (at D' in FIG. 4) generally in a plane perpendicular to the dart 26 so as to partially wrap about one another and to extend away from the dart 26 in opposing directions. The base 24 is completed by curling the remaining free end portions of the wire 22 into separate loop portions 28a, 28b, which preferably are circular closed loops. More particularly, the extreme opposing free ends or tips 22a, 22b of the wire 22 are each wrapped (counter clockwise in FIG. 4) under other respective portions of the wire 22 intermediate the ends 22a, 22b and the crossing, so as to overlap with such other intermediate portions and define opposing, completely closed portions 28a, 28b of the base 24. Preferably each closed portion 28a, 28b is an at least generally circular closed loop as shown, although other closed perimeter shapes could be used and formed in other ways. It is further noted that the shape of each half of the wire 12 extending away form the medial bend is identical. As a result, the first portion 28a is a reversed mirror image of the second portion 28b of the base 24 on opposing lateral sides of the central longitudinal axis 26 of dart 26 when the base 24 is viewed in plan as in FIG. 4.

Each of the dart 26 and the base 24 is generally planar and defines a plane in which each respectively lies. The plane of the dart 26 is parallel to the plane of FIG. 3. The dart 26 has a central longitudinal axis 26' which is located in the plane of the dart 26. The plane of the base 24 is parallel to the plane of FIG. 4. The base 24 also has a central longitudinal axis 24', which is located in the plane of the base. Each central longitudinal axis 26' and 24' is greater in magnitude than any lateral axis of the dart and base, respectively, which is perpendicular to its central axis 26' and 24', respectively in the planes of the dart and base, respectively. Furthermore, as can be seen in FIG. 4, the dart 26 is at least generally centered on the base 24 such that the central longitudinal axes 26' of the dart and 24' of the base generally intersect one another and lie in and are coplanar with the plane of the dart 26. The plane of dart 26 divides medial bend A and passes between the dart sides 26a, 26b at the crossing. The plane of base 24 is perpendicular to the plane of dart 26.

Medial bend A defines two adjoining halves or "arms" 20a, 20b of the fastener 20. The arms 20a and 20b are preferably identical to one another and, as can be seen from FIG. 3, extend away from the medial bend A in the wire 22, which defines the tip of the dart 26 distal to the base 24, and away from one another on initial sides of the longitudinal axis 26' to bend B. At bend B and again at bend C', the sides portions 26a, 26b of the arms 20a, 20b then extend toward one another and finally cross by one another, side by side, generally at the central longitudinal axis 26' of dart 26 to respective opposite sides of that axis 26'. The crossing defines the end of the dart 26 proximal to the base 24. The remaining free ends of the arms 20a, 20b thereafter extend away from the crossing and apart from one another and remain on the respective opposing sides of the central longitudinal axis 26' of the dart 26 while defining the base 24. Each of the remaining free ends of the arms is bent back upon another portion of that arm intermediate the tip of that arm and the crossing or dart 26 and overlaps with such other portion generally in the plane of the base 24, which is perpendicular to the plane of the dart 24, so as to define the closed portions 28a, 28b, respectively. Each of the two halves or arms 20a, 20b of the depicted, preferred embodiment fastener 20 is identical when viewed on end as in FIG. 5.

FIGS. 9–12 depict a second preferred embodiment wire spring fastener indicated generally at 120 having a dart 126 substantially identical to that of fastener 20 but with a different base indicated generally at 124. Rather than overlapping the remaining extreme free ends or tips of the wire forming fastener 120 with portions of the wire intermediate the dart 126 and those ends, the remaining extreme free ends or tips of the wire are butted against such intermediate portions forming at least generally circular, completely closed loop portions 128a, 128b, that are planar and only as thick as the thickness of the wire and preferably at least generally coplanar with one another and the plane of the base 124. Again, medial bend A defines two arms which are preferably identical and which extend away from one another and opposite sides of the bend A. Again, the plane of dart 126 passes through medial bend and between the sides of the dart 126 at the crossing and the plane of base 124 is perpendicular to the plane of dart 126. One of the difference between base 124 and the other bases 14, 24 is that distinct bends D and D' are eliminated in base 124. This simplifies their fabrication even further with no compromise of their fastening ability and their ability not to become entangled with one another when clustered together in a container or fed sequentially through a feed shoot.

Spring fastener fasteners 20, 120 are preferably made from diamond drawn, 304 stainless steel wire, 25 mils more or less in diameter, approximately one-quarter hardened to a tensile strength of between about 165,000 and about 190,000 psi. The entire wire may be partially hardened along its entire length or along only part or parts of its length, in the area(s) or segment(s) where it is needed to provide resilience and/or spring action. The wire can be hardened before or after bending.

Spring fasteners 20, 120 can be made by first curling the ends of a single length of wire in opposite directions to form the circular loop portions, then bending the straight portion of the wire between the loops to define the dart 26 and then the remainder of the base. Alternatively, the dart can be formed first and the loops and base formed last. Heat may be selectively applied to portions of a wire initially hardened along its entire length to better control the bend(s).

Figure 6:
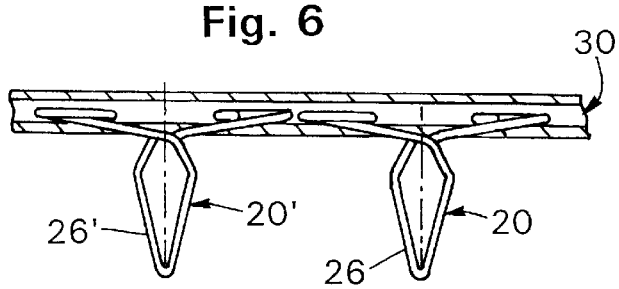
FIG. 6 depicts diagrammatically a plurality of the preferred fasteners lined up sequentially in a feed channel.

As previously noted, the bend in each half of the wire, which more or less defines where the dart joins the base (bend C'), defines two angles (totaling 360°), the smaller of which can be equal to or greater than 130° so that the dart 26 is respectively recessed level with the closed portions (not depicted but like the dart 16 of prior art fastener 10 in FIGS. 1 and 2) or elevated noticeably above the bottom sides of the closed portions 28a, 28b as shown. As a result, the base 24 of fastener 20 can have a height several times the thickness of the wire 22 whereas with the prior fasteners 10, the height of the base 14 was supposed to be equal or essentially equal to the thickness of the wire 12. The same is true for fastener 120. Increasing the thickness of the base, forming fully closed circular loops which do not fit into one another and eliminating the end to end alignment of the long free ends of the wire appears to prevent adjoining fasteners 20, 120 from entangling and from overlapping when they are fed serially in a longitudinal orientation down a feed channel 30, as is indicated diagrammatically in FIG. 6. The darts 26, 26' of consecutive fasteners 20, 20' remain longitudinally spaced apart sufficiently so that each one can be caught and individually released by a suitably designed escapement system, which is not part of the present invention.

Fasteners 20, 120 of the present invention would be used in the gasket and gasket-like devices disclosed in U.S. Pat. Nos. 4,986,033 and 5,107,623, which are incorporated by reference herein in their entireties. The gasket and gasket-like members disclosed in those patents included an elongated core, which might be in the form of a hollow, tubular member, and a woven outer jacket surrounding the core through which the dart portion 16 of each of the prior fastener 10 protruded. The base portion 14 was captured between the core and the woven outer jacket.

It is also possible to provide a gasket or gasket-like device formed from a unitary tubular member into which the fasteners 20 or 120 are mounted. As shown in FIG. 7, a gasket or gasket-like device 40 includes a tubular member 42 mounting a plurality of the fasteners 20 or 120, the former being specifically shown. Member 42 is formed by a tubular wall 44 having opposing, inner circumferential and outer circumferential sides 45 and 46 respectively. The engagement portion or dart 26 (or 126) of each fastener 20 (or 120) through the member with the base portion 24 (or 124) of the fastener 20 (or 120) facing the inner circumferential side 45 of the wall 44 and the distal end of the engagement portion or dart 26 projecting generally perpendicularly away from the outer circumferential side 46 of the wall 44. The tubular member 42 may be of woven metal wire, woven glass fiber yarn, or, preferably, a composite tubular member formed from parallel strands or "ends" of wire and glass fiber yarn woven together in a conventional, regular pattern to form a composite seamless wall 44. Individual wire and fiberglass yarn ends are indicated diagrammatically at 47 and 48, respectively. The term "weaving" is being used in the broadest sense to encompass, in addition to conventional loom-type weaving, knitting and braiding, which actually would be preferred to conventional loom weaving for constructing seamless tubular member 42. In each instance, one or more ends of strand material are interwoven with itself or themselves or other strand material(s) in a regular pattern by knitting, braiding or conventional weaving. Preferably the wire end(s) 47 would be at least partially hardened so that the tubular member 42 would retain its tubular shape and tend to retain the fasteners 20 (or 120) by remaining tightly positioned about the dart 26 (or 126) near the base 24 (or 124) where the width of the dart is reduced. If desired, the tubular member 42 can be woven over a core member 48 (in phantom in FIG. 8), which can be provided to further retain the fasteners 20 or 120 in tubular member 42 in the manner disclosed in the aforementioned U.S. Patents. The core member 48 could be solid or tubular, generally circular as shown or of another cross-sectional configuration, as desired.

It should be understood that this invention is not limited to the particular embodiments or instrumentalities shown, but is intended to cover all modifications which are within the scope and spirit of the invention as defined by the appended claims.

We claim:

1. In a bent wire spring fastener, which is formed by a single length of hardened metal wire having a pair of opposing ends, the wire being bent to form a generally planar base with a generally planar dart projecting transversely from one generally planar major side of the base, an improvement wherein at least one of the ends of the wire is bent back upon another portion of the wire intermediate the ends and overlapped with the other portion so as to define a completely closed portion of the base on one lateral side of the dart.

2. The bent wire spring fastener of claim 1 wherein the closed portion forms a first closed loop on the one lateral side of the dart and wherein the base comprises a second closed loop formed of the wire on an opposing lateral side of the dart.

3. The bent wire spring fastener of claim 1 in combination with a member defined by a tubular wall having opposing inner and outer circumferential sides, the base being positioned against the inner circumferential side of the tubular wall and the dart extending through the tubular wall and projecting away from the outer circumferential side.

4. The combination of claim 3 further comprising at least a second bent wire spring fastener identical to the originally claimed bent wire spring fastener, the originally claimed bent wire spring fastener and the second, identical spring fastener being separate and spaced apart from one another longitudinally along the tubular wall of the member, the second, identical spring fastener having a base positioned against the inner circumferential side and a dart extending through the tubular wall and projecting away from the outer circumferential side.

5. The combination of claim 3 wherein the tubular member comprises a strand of metal wire interwoven into at least part of the tubular wall of the member.

6. The combination of claim 5 wherein the member further comprises an end of glass fiber yarn interwoven together with the strand of metal wire into at least part of the tubular wall.

7. The combination of claim 6 further comprising a core within the member trapping the base of each fastener with the inner circumferential side of the tubular wall of the member.

8. The combination of claim 5 wherein only the metal wire interwoven into the tubular wall retains each fastener in the tubular member.

9. The bent wire spring fastener of claim 1 wherein each of the dart and the base has a plane and a longitudinal axis and a lateral axis perpendicular to the longitudinal axis in its plane, the longitudinal axis being greater in magnitude than the corresponding perpendicular lateral axis in each plane and the longitudinal axis of each of the dart and the base being generally parallel with the plane of the dart, wherein the wire includes a medial bend defining a tip of the dart distal to the base and a pair of arms continuous at the medial bend, each arm extending away from the medial bend and one another and then towards one another along initial sides of the longitudinal axis of the dart, the pair of arms crossing by one another side by side generally at the longitudinal axis of the dart to respective opposing sides of the longitudinal axis of the dart, the crossing defining an end of the dart proximal the base, free ends of the arms extending apart and away from the crossing and remaining on the respective opposing sides of the longitudinal axis of the dart.

10. The bent wire spring fastener of claim 9 wherein the medial bend divides the fastener into two identical halves extending away from one another on opposite sides of the bend.

11. In a bent wire spring fastener, which is formed by a single length of metal wire hardened along at least part of its length, the wire being bent to form a generally planar base with a generally planar dart projecting transversely from one generally planar major side of the base, an improvement wherein each of the dart and the base has a plane and a central longitudinal axis in the plane, the central longitudinal axis of each of the dart and base being greater in magnitude than any lateral axis of the dart and base perpendicular to the central longitudinal axis in the respective planes of the dart and the base, wherein the dart is at least generally centered on the base such that the central longitudinal axes of the dart and the base generally intersect one another, wherein the wire includes a medial bend defining a tip of the dart distal to the base and a pair of arms continuous from the medial bend, each arm extending away from the medial bend and one another and then towards one another along separate initial sides of the central longitudinal axis of the dart, the pair of arms crossing by one another, side by side, generally at the central longitudinal axis of the dart to respective opposing sides of central the longitudinal axis of the dart, the crossing defining an end of the dart proximal the base, free ends of the arms extending away from the crossing and apart from one another and terminating in separate closed loop portions on the respective opposing sides of the central longitudinal axis of the dart.

12. The bent wire spring fastener of claim 11 wherein the extreme tip of each free end of the arm is butted against another portion of that free end of the arm between the dart and the extreme tip to form a planar closed loop.

13. The bent wire spring fastener of claim 12 wherein the tip of each free end of each arm is butted against another portion of the arm between the tip of the arm and the dart to form a planar closed loop.

14. The bent wire spring fastener of claim 12 wherein the tip of each free end of the arm is overlapped with another portion of the arm between the tip of the arm and the dart to define a completely closed loop.

15. The best wire spring fastener of claim 11 wherein the extreme tip of each free end of the arm is overlapped with another portion of that free end of the arm between the dart and the extreme tip to define one of completely closed loops.

16. The best wire spring fastener of claim 11 wherein the arms of the pair are identical to one another.

17. The bent wire spring fastener of claim 11 in combination with a member defined by a tubular wall having opposing inner and outer circumferential sides, the base being positioned against the inner circumferential side of the tubular wall and the dart extending through the tubular wall and projecting away from the outer circumferential side.

18. The bent wire spring fastener of claim 11 wherein each free end of each of the arms defines a separate loop on a separate lateral side of the central longitudinal axis of the dart.

19. In a bent wire spring fastener, which is formed by a single length of metal wire hardened along at least part of its length, the wire being bent to form a generally planar base with a generally planar dart projecting transversely from one generally planar major side of the base, an improvement wherein each of the dart and the base has a plane and a central longitudinal axis in the plane, the central longitudinal axis of each of the dart and base being greater in magnitude than any lateral axis of the dart and base perpendicular to the central longitudinal axis of the dart and the base in the respective planes of the dart and the base, wherein the dart is at least generally centered on the base such that the longitudinal axes of the dart and the base generally intersect one another, wherein the wire includes a medial bend defining a tip of the dart distal to the base and dividing the fastener into a pair of identical arms, the arms extending away from the medial bend and one another and then towards one another along separate initial sides of the longitudinal axis of the dart, the pair of arms crossing by one another, side by side, generally at the longitudinal axis of the dart to respective opposing sides of the longitudinal axis of the dart, the crossing defining an end of the dart proximal the base, remaining free ends of the arms extending apart and away from the crossing and defining the base.

20. The bent wire spring fastener of claim 19 in combination with a member defined by a tubular wall having opposing inner and outer circumferential sides, the base being positioned against the inner circumferential side of the tubular wall and the dart extending through the tubular wall and projecting away from the outer circumferential side.

* * * * *